US009759495B2

(12) United States Patent
Payne et al.

(10) Patent No.: US 9,759,495 B2
(45) Date of Patent: Sep. 12, 2017

(54) BATTERY CELL ASSEMBLY HAVING HEAT EXCHANGER WITH SERPENTINE FLOW PATH

(75) Inventors: Josh Payne, Royal Oak, MI (US); Igor Isayev, Berkley, MI (US); Heekook Yang, Ontario (CA); William Koetting, Davisburg, MI (US); Peter Morris, Novi, MI (US); Venkatachala Moorthi Natarajan, Largo, FL (US)

(73) Assignee: LG Chem, Ltd., Seoul (KR)

( * ) Notice: Subject to any disclaimer, the term of this patent is extended or adjusted under 35 U.S.C. 154(b) by 1880 days.

(21) Appl. No.: 12/165,100

(22) Filed: Jun. 30, 2008

(65) Prior Publication Data
US 2009/0325054 A1 Dec. 31, 2009

(51) Int. Cl.
| H01M 10/50 | (2006.01) |
| F28F 3/12 | (2006.01) |
| H01M 10/615 | (2014.01) |
| H01M 10/647 | (2014.01) |
| H01M 10/652 | (2014.01) |
| H01M 10/6557 | (2014.01) |
| H01M 10/6567 | (2014.01) |
| H01M 10/6566 | (2014.01) |
| H01M 10/651 | (2014.01) |
| H01M 10/613 | (2014.01) |

(52) U.S. Cl.
CPC ............ *F28F 3/12* (2013.01); *H01M 10/613* (2015.04); *H01M 10/615* (2015.04); *H01M 10/647* (2015.04); *H01M 10/651* (2015.04); *H01M 10/652* (2015.04); *H01M 10/6557* (2015.04); *H01M 10/6566* (2015.04); *H01M 10/6567* (2015.04)

(58) Field of Classification Search
CPC ............. H01M 10/613; H01M 10/615; H01M 10/6566
See application file for complete search history.

(56) References Cited

U.S. PATENT DOCUMENTS

| 1,587,425 A | 6/1926 | Otto |
| 2,273,244 A | 2/1942 | Cornelius |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,390,841 A | 6/1983 | Martin et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A * | 2/1993 | Ouchi et al. .................. 165/177 |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A * | 7/1994 | Juger ............................ 165/153 |
| 5,346,786 A | 9/1994 | Hodgetts |
| 5,356,735 A | 10/1994 | Meadows et al. |

(Continued)

FOREIGN PATENT DOCUMENTS

| DE | 19639115 A | 3/1998 |
| EP | 1577966 A | 9/2005 |

(Continued)

OTHER PUBLICATIONS

U.S. Appl. No. 12/164,627, filed Jun. 30, 2008 entitled Battery Module Having Cooling Manifold and Method for Cooling Battery Module.
U.S. Appl. No. 12/164,780, filed Jun. 30, 2008 entitled Battery Module Having Battery Cell Assembly with Heat Exchanger.
U.S. Appl. No. 12/164,741, filed Jun. 30, 2008 entitled Battery Module Having Battery Cell Assemblies with Alignment-Coupling Features.
U.S. Appl. No. 12/164,445, filed Jun. 30, 2008 entitled Battery Module Having a Rubber Cooling Manifold.
U.S. Appl. No. 12/016,630, filed Jan. 18, 2008 entitled Battery Cell Assembly and Method for Assembling the Battery Cell Assembly.
U.S. Appl. No. 11/828,927, filed Jul. 26, 2007 entitled Battery Cell Carrier Assembly Having a Battery Cell Carrier for Holding a Battery Cell Therein.

(Continued)

*Primary Examiner* — Ladan Mohaddes
(74) *Attorney, Agent, or Firm* — Buckert Patent & Trademark Law Firm PC; John F. Buckert

(57) ABSTRACT

A battery cell assembly is provided. The battery cell assembly includes a battery cell and a heat exchanger disposed adjacent the battery cell configured to cool the battery cell. The heat exchanger has an outer housing. The outer housing defines an interior region and first and second flow guide members. The first and second flow guide members define a serpentine flow path in the interior region. The first and second flow guide members are tilted generally upwardly in the interior region. The serpentine flow path extends from an inlet aperture in the outer housing to another flow path in the outer housing. The another flow path extends from the serpentine flow path to an outlet aperture. The another flow path has a smaller cross-sectional area than a cross-sectional area of each portion of the serpentine flow path such that air bubbles in fluid entering the inlet aperture are urged upwardly through the serpentine flow path and accelerated through the another flow path to exit the outer housing at the outlet aperture.

10 Claims, 11 Drawing Sheets

(56) References Cited

U.S. PATENT DOCUMENTS

| | | | |
|---|---|---|---|
| 5,443,926 A | 8/1995 | Holland et al. | |
| 5,510,203 A | 4/1996 | Hamada et al. | |
| 5,520,976 A | 5/1996 | Giannetti et al. | |
| 5,606,242 A | 2/1997 | Hull et al. | |
| 5,652,502 A | 7/1997 | Van Phuoc et al. | |
| 5,658,682 A | 8/1997 | Usuda et al. | |
| 5,663,007 A | 9/1997 | Ikoma et al. | |
| 5,736,836 A * | 4/1998 | Hasegawa et al. | 320/128 |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,937,664 A | 8/1999 | Matsuno et al. | |
| 5,982,403 A | 11/1999 | Inagaki | |
| 5,985,483 A | 11/1999 | Verhoog et al. | |
| 6,016,047 A | 1/2000 | Notten et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,344,728 B1 | 2/2002 | Kouzu et al. | |
| 6,353,815 B1 | 3/2002 | Vilim et al. | |
| 6,362,598 B2 | 3/2002 | Laig-Hoerstebrock et al. | |
| 6,399,238 B1 | 6/2002 | Oweis et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,512,347 B1 | 1/2003 | Hellmann et al. | |
| 6,515,454 B2 | 2/2003 | Schoch | |
| 6,534,954 B1 | 3/2003 | Plett | |
| 6,563,318 B2 | 5/2003 | Kawakami et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,878,485 B2 | 4/2005 | Ovshinsky et al. | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,039,534 B1 | 5/2006 | Ryno et al. | |
| 7,061,246 B2 | 6/2006 | Dougherty et al. | |
| 7,070,874 B2 | 7/2006 | Blanchet et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,143,124 B2 | 11/2006 | Garthwaite | |
| 7,150,935 B2 | 12/2006 | Hamada et al. | |
| 7,197,487 B2 | 3/2007 | Hansen et al. | |
| 7,199,557 B2 | 4/2007 | Anbuky et al. | |
| 7,250,741 B2 | 7/2007 | Koo et al. | |
| 7,253,587 B2 | 8/2007 | Meissner | |
| 7,264,902 B2 | 9/2007 | Horie et al. | |
| 7,278,389 B2 | 10/2007 | Kirakosyan | |
| 7,315,789 B2 | 1/2008 | Plett | |
| 7,321,220 B2 | 1/2008 | Plett | |
| 7,327,147 B2 | 2/2008 | Koch | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 8,409,743 B2 | 4/2013 | Okada et al. | |
| 2002/0182493 A1 | 12/2002 | Ovshinsky et al. | |
| 2003/0080714 A1 | 5/2003 | Inoue et al. | |
| 2003/0184307 A1 | 10/2003 | Kozlowski et al. | |
| 2003/0211384 A1 | 11/2003 | Hamada et al. | |
| 2004/0069474 A1* | 4/2004 | Wu et al. | 165/170 |
| 2005/0026014 A1 | 2/2005 | Fogaing et al. | |
| 2005/0089750 A1 | 4/2005 | Ng et al. | |
| 2005/0100786 A1 | 5/2005 | Ryu et al. | |
| 2005/0103486 A1* | 5/2005 | Demuth et al. | 165/174 |
| 2005/0110460 A1 | 5/2005 | Arai et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2006/0234119 A1 | 10/2006 | Kruger et al. | |
| 2006/0286450 A1 | 12/2006 | Yoon et al. | |
| 2007/0035307 A1 | 2/2007 | Schoch | |
| 2007/0046292 A1 | 3/2007 | Plett | |
| 2007/0062681 A1 | 3/2007 | Beech | |
| 2007/0074859 A1* | 4/2007 | Nakada | 165/153 |
| 2007/0087266 A1 | 4/2007 | Bourke et al. | |
| 2007/0103120 A1 | 5/2007 | Plett | |
| 2007/0120533 A1 | 5/2007 | Plett | |
| 2007/0188143 A1 | 8/2007 | Plett | |
| 2007/0227166 A1 | 10/2007 | Rafalovich et al. | |
| 2007/0236182 A1 | 10/2007 | Plett | |
| 2008/0003491 A1 | 1/2008 | Yahnker et al. | |
| 2008/0041079 A1 | 2/2008 | Nishijima et al. | |
| 2008/0094035 A1 | 4/2008 | Plett | |
| 2008/0110189 A1 | 5/2008 | Alston et al. | |
| 2008/0182151 A1 | 7/2008 | Mizusaki et al. | |
| 2008/0248338 A1 | 10/2008 | Yano et al. | |
| 2008/0299446 A1 | 12/2008 | Kelly | |
| 2008/0314071 A1 | 12/2008 | Ohta et al. | |
| 2009/0074478 A1 | 3/2009 | Kurachi | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0258289 A1* | 10/2009 | Weber et al. | 429/120 |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0052959 A1 | 3/2011 | Koetting et al. | |
| 2012/0082880 A1 | 4/2012 | Koetting et al. | |
| 2013/0255293 A1 | 10/2013 | Gadawski et al. | |
| 2013/0309542 A1 | 11/2013 | Merriman et al. | |
| 2014/0050953 A1 | 2/2014 | Yoon et al. | |
| 2014/0050966 A1 | 2/2014 | Merriman et al. | |

FOREIGN PATENT DOCUMENTS

| | | |
|---|---|---|
| EP | 1852925 A | 11/2007 |
| EP | 2262048 A | 12/2010 |

(56) References Cited

FOREIGN PATENT DOCUMENTS

| | | |
|---|---|---|
| GB | 481891 A | 3/1938 |
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |

OTHER PUBLICATIONS

"Gasket". Merriam-Webster. Merriam-Webster. Web. May 30, 2012. <http://www.merriam-webster.com/dictionary/gasket>.

International Search Report; International Application No. PCT/KR2009/000258; International Filing Date: Jan. 16, 2009; dated Aug. 28, 2009; 2 pages.

International Search Report; International Application No. PCT/KR2009/003428, International Filing Date: Jun. 25, 2009; dated Jan. 22, 2010; 2 pages.

International Search Report; International Application No. PCT/KR2009/003429; International Filing Date: Jun. 25, 2009; dated Jan. 12, 2010; 3 pages.

International Search Report; International Application No. PCT/KR2009/003430; International Filing Date: Jun. 25, 2009; dated Feb. 3, 2010; 2 pages.

International Search Report; International Application No. PCT/KR2009/003434; International Filing Date: Jun. 25, 2009; dated Jan. 18, 2010; 2 pages.

International Search Report; International Application No. PCT/KR2009/003436; International Filing Date: Jun. 25, 2009; dated Jan. 22, 2010; 2 pages.

International Search Report; International Application No. PCT/KR2009/006121; International Filing Date: Oct. 22, 2009; dated May 3, 2010; 2 pages.

International Search Report; International Application No. PCT/KR2010/002334; International Filing Date: Apr. 15, 2010; dated Nov. 29, 2010; 2 pages.

International Search Report; International Application No. PCT/KR2010/002336; International Filing Date: Apr. 15, 2010; dated Jan. 31, 2011; 2 pages.

International Search Report; International Application No. PCT/KR2010/002337; International Filing Date: Apr. 15, 2010; dated May 3, 2010; 2 pages.

International Search Report; International Application No. PCT/KR2010/002340; International Filing Date: Apr. 15, 2010; dated Jan. 31, 2011; 2 pages.

International Search Report; International Application No. PCT/KR2010/004944; International Filing Date: Jul. 28, 2010; dated Apr. 29, 2011; 2 pages.

International Search Report; International Application No. PCT/KR2010/005639; International Filing Date: Aug. 24, 2010; dated Jun. 3, 2011; 2 pages.

Machine translation of Japanese Patent Application No. 2009-009889 A, published Jan. 15, 2009.

Thomas J. Gadawski et al., pending U.S. Appl. No. 13/433,649 entitled "Battery System and Method For Cooling the Battery System," filed Mar. 29, 2012.

U.S. Appl. No. 13/475,963, filed May 19, 2012 entitled Battery Cell Assembly and Method for Manufacturing a Cooling Fin for the Battery Cell Assembly.

U.S. Appl. No. 13/586,960, filed Aug. 16, 2012 entitled Battery Module.

U.S. Patent Application No. 13/587,030, filed Aug. 16, 2012 entitled Battery Module and Method for Assembling the Battery Module.

U.S. Appl. No. 13/686,018, filed Nov. 27, 2012 entitled Battery System and Method for Cooling a Battery Cell Assembly.

U.S. Appl. No. 13/766,162, filed Feb. 13, 2013 entitled Battery Cell Assembly and Method for Manufacturing the Battery Cell Assembly.

U.S. Appl. No. 14/059,547, filed Oct. 22, 2013 entitled Battery Cell Assembly.

U.S. Appl. No. 13/861,426, filed Apr. 12, 2013 entitled Battery Cell Assembly and Method for Manufacturing a Cooling Fin for the Battery Cell Assembly.

U.S. Appl. No. 13/936,556, filed Jul. 8, 2013 entitled Battery Assembly.

U.S. Appl. No. 14/161,806, filed Jan. 23, 2014 entitled Battery Cell Assembly and Method for Coupling a Cooling Fin to First and Second Cooling Manifolds.

* cited by examiner

BATTERY CELL ASSEMBLY HAVING HEAT EXCHANGER WITH SERPENTINE FLOW PATH

TECHNICAL FIELD

This application relates generally to a battery cell assembly having a heat exchanger with a serpentine flow path.

BACKGROUND OF THE INVENTION

Cooling units have been developed to cool devices. However, a problem associated with a cooling unit is that air bubbles can become trapped in the cooling unit that can prevent a desired fluid flow rate through the cooling unit. As a result, the cooling unit may not be able to maintain a device at a desired temperature.

Accordingly, the inventors herein have recognized a need for an improved battery module having a heat exchanger that minimizes and/or eliminates the above-mentioned deficiency.

SUMMARY OF THE INVENTION

A battery cell assembly in accordance with an exemplary embodiment is provided. The battery cell assembly includes a battery cell and a heat exchanger disposed adjacent the battery cell configured to cool the battery cell. The heat exchanger has an outer housing. The outer housing defines an interior region and first and second flow guide members. The first and second flow guide members define a serpentine flow path in the interior region. The first and second flow guide members are tilted generally upwardly in the interior region. The serpentine flow path extends from an inlet aperture in the outer housing to another flow path in the outer housing. The another flow path extends from the serpentine flow path to an outlet aperture. The another flow path has a smaller cross-sectional area than a cross-sectional area of each portion of the serpentine flow path such that air bubbles in fluid entering the inlet aperture are urged upwardly through the serpentine flow path and accelerated through the another flow path to exit the outer housing at the outlet aperture.

DETAILED DESCRIPTION OF AN EXEMPLARY EMBODIMENT

Figure 1:
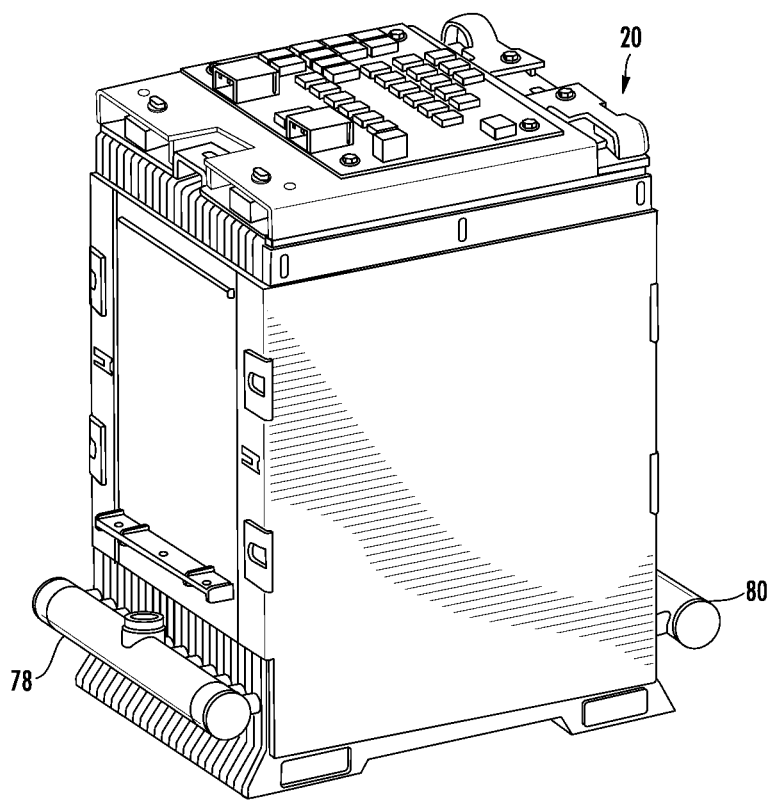
FIG. 1 is a schematic of a battery module in accordance with an exemplary embodiment.
Figure 2:
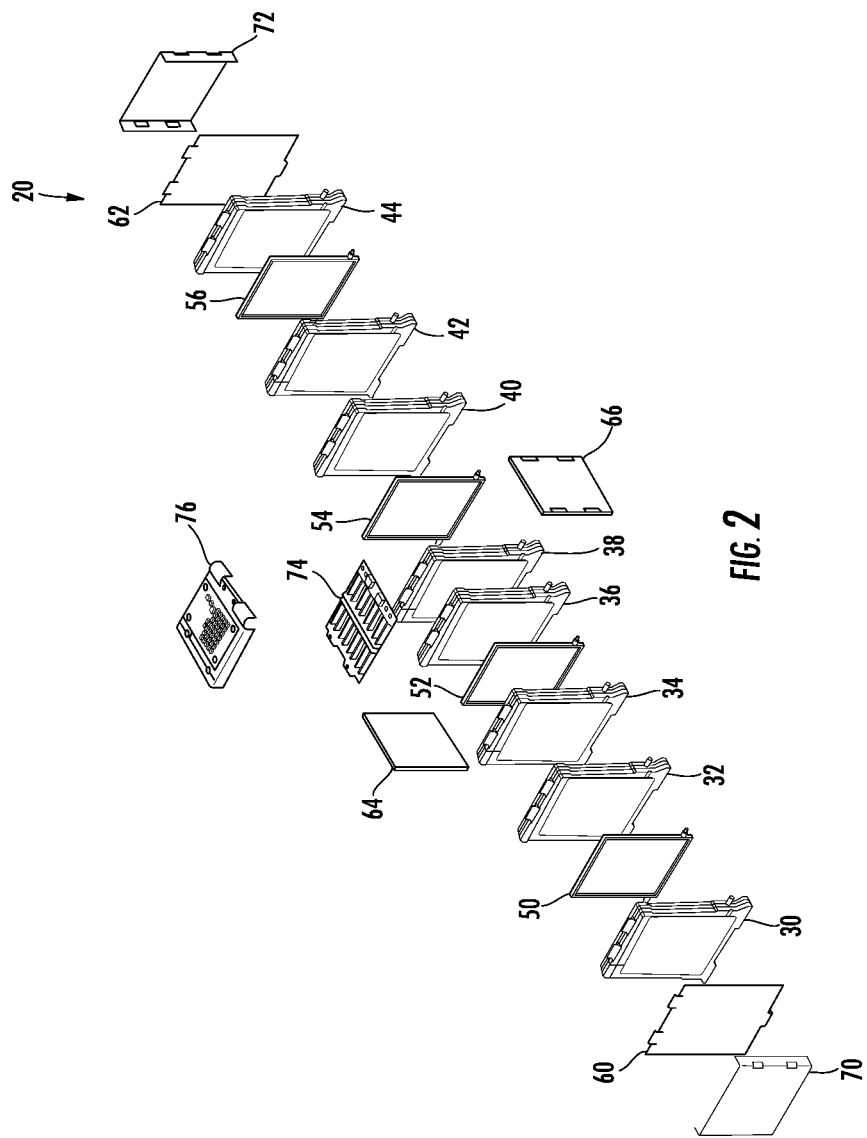
FIG. 2 is an exploded schematic of a portion of the battery module of FIG. 1.

Referring to FIGS. 1 and 2, a battery module 20 for providing electrical power is provided. The battery module 20 includes battery cell assemblies 30, 32, 34, 36, 38, 40, 42, 44, heat exchangers 50, 52, 54, 56, side plates 60, 62, 64, 66, coupling plates 70, 72, an interconnect assembly 74, a cover 76, and cooling manifolds 78, 80. A battery cell assembly is defined as a housing having a battery cell therein. A battery module is defined as at least two battery cell assemblies coupled together.

The battery cell assemblies 30, 32, 34, 36, 38, 40, 42, 44 are electrically coupled together utilizing the interconnect assembly 74. In particular, the interconnect assembly 74 electrically couples together electrical terminals from the battery cell assemblies in a desired configuration to provide an electrical current and voltage therefrom.

The heat exchangers 50, 52, 54, 56 receive a fluid from the cooling manifold 78 to cool the battery cell assemblies. The heated fluid from the heat exchangers 50, 52, 54, 56 is received by the cooling manifold 80.

The side plates 60, 62, 64, 66 are coupled to the battery cell assemblies to provide additional support for the battery cell assemblies. The coupling plates 70, 72 are provided to engage the side plates 64, 66 to provide additional support for the battery cell assemblies. The cover plate 76 is provided to cover the interconnect assembly 74.

Referring to FIGS. 3, 4, 5, 6 and 7, a battery cell assembly 32 in accordance with an exemplary embodiment that is utilized in the battery module 20 will be explained. The battery cell assembly 32 includes a rectangular ring-shaped frame member 90, a battery cell 92, a securement ring-shaped member 94, a battery cell 96, a rectangular ring-shaped frame member 98, a heat exchanger 100, a securement ring-shaped member 102, a battery cell 104, and a rectangular ring-shaped frame member 106. An advantage of the battery cell assembly 32 is that the assembly 32 is packaged such that a single heat exchanger 100 can cool the battery cells 92, 96, 104 to maintain the battery cells at a desired temperature.

Figure 3:
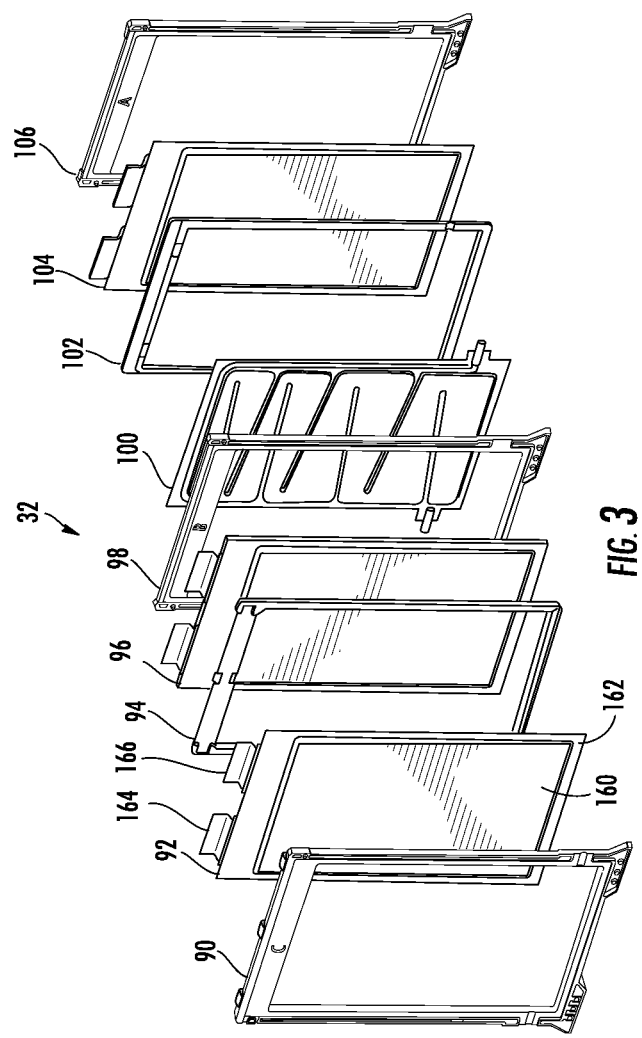
FIG. 3 is an exploded schematic of a battery cell assembly utilized in the battery module of FIG. 2.
Figure 4:
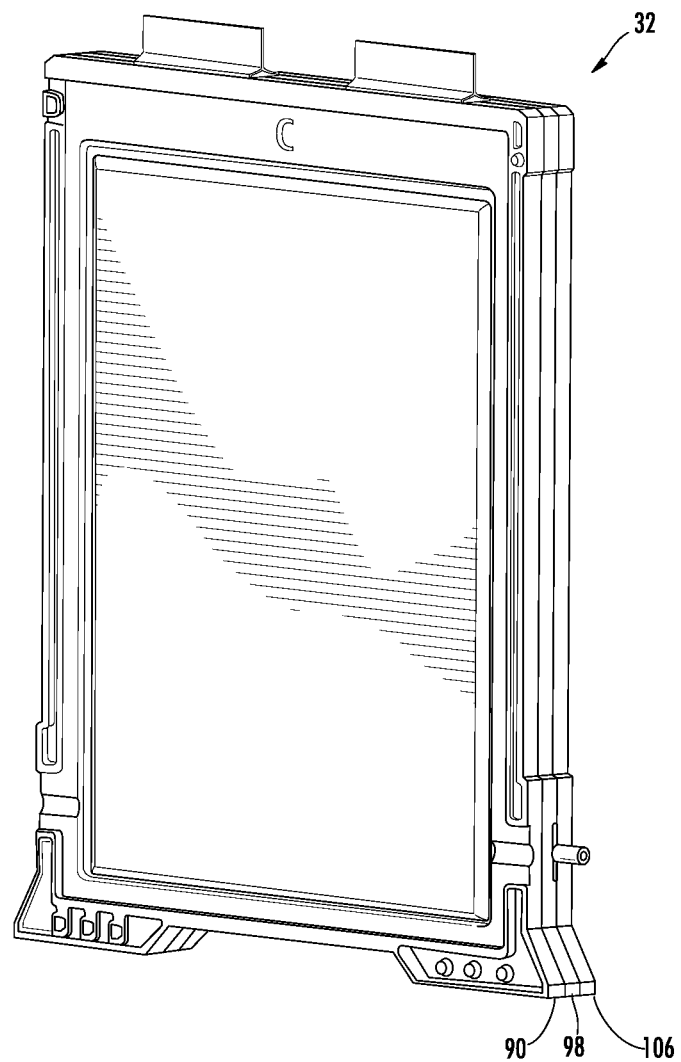
FIG. 4 is another schematic of the battery cell assembly of FIG. 3.
Figure 5:
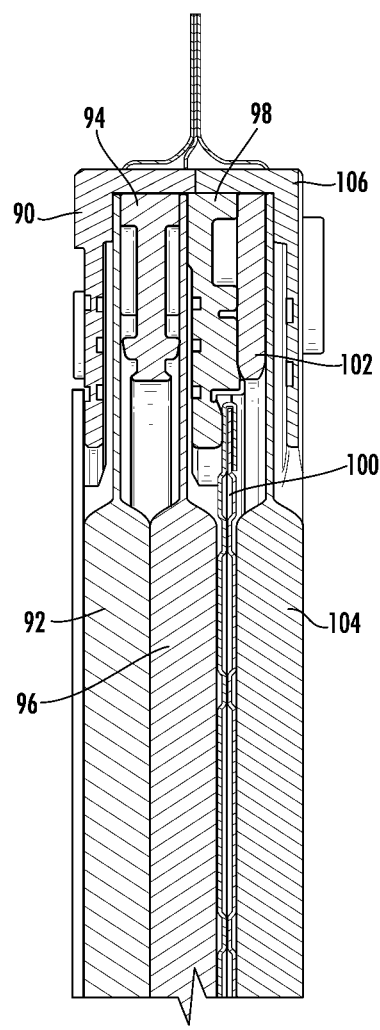
FIG. 5 is a cross-sectional schematic of a top portion of the battery cell assembly of FIG. 3.
Figure 6:
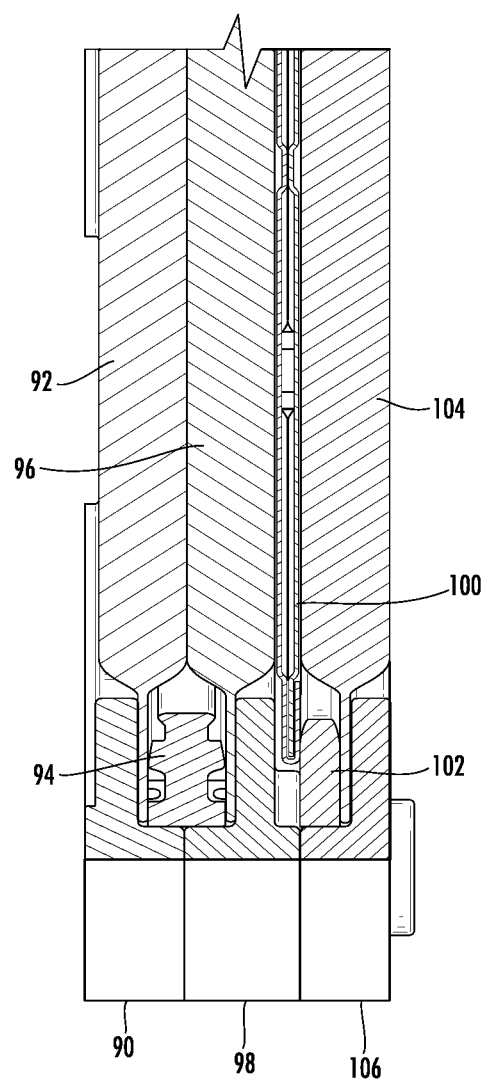
FIG. 6 is a cross-sectional schematic of a bottom portion of the battery cell assembly of FIG. 3.

Referring to FIGS. 3, 5 and 6, the rectangular ring-shaped frame member 90 is configured to be coupled to the rectangular ring-shaped frame member 98 for holding the battery cell 92, the securement ring-shaped member 94, and the battery cell 96 therebetween.

Referring to FIG. 3, the battery cell 92 is provided to output an operational voltage between the electrical terminals 164, 166. The battery cell 92 includes a body portion 160 and a peripheral lip portion 162 extending around the body portion 160, and electrical terminals 164, 166 extending from the body portion 160. In one exemplary embodiment, the battery cell 92 is a lithium battery cell. Of course, in alternative embodiments, the battery cell 92 can comprise other types of battery cells known to those skilled in the art. The size of the peripheral lip portion 162 is smaller than a size of the rectangular ring-shaped frame member 90 such that the frame member 90 covers the peripheral lip portion 162 of the battery cell 92. Referring to FIGS. 5 and 6, the battery cell 92 is disposed between the frame member 90 and a portion of the securement ring-shaped member 94 and the battery cell 96.

Referring to FIGS. 3, 5 and 6, the securement ring-shaped member 94 is provided to further secure the battery cells 92, 96 between the rectangular ring-shaped members 90, 98. An outer peripheral size of the securement ring-shaped member 94 is smaller than an outer peripheral size of the rectangular ring-shaped frame member 90 and smaller than an outer peripheral size of the rectangular ring-shaped frame member 98. The securement ring-shaped member 94 is disposed between the peripheral lip portions of the battery cells 92, 96 to further support the battery cells 92, 96.

The battery cell 96 is disposed between the rectangular ring-shaped frame member 98 and both a portion of the battery cell 92 and the securement ring-shaped member 94. The structure of the battery cell 96 is substantially similar to the battery cell 92.

Referring to FIG. 3, the rectangular ring-shaped frame member 98 is configured to be coupled to the rectangular ring-shaped frame member 90 for holding the battery cell 92, the securement ring-shaped member 94, and the battery cell 96 therebetween. Further, the rectangular ring-shaped frame member 98 is provided to couple to the rectangular ring-shaped frame member 106 for holding the heat exchanger 100, the securement ring-shaped member 102, and the battery cell 104 therebetween.

Referring to FIGS. 3, 7, 8 and 11, the heat exchanger 100 is provided to cool the battery cell assembly 32 to maintain a temperature of the battery cells 92, 96, 104 at a desired temperature. In particular, the heat exchanger 100 receives a fluid from the cooling manifold 78, shown in FIG. 1, that flows through the heat exchanger 100 to extract heat energy from the battery cells 92, 96, 104. Thereafter, the heated fluid flows out of the heat exchanger 100 into the cooling manifold 80 shown in FIG. 1. The heat exchanger 100 includes an outer housing 202, an inlet tube 204, and an outlet tube 206.

Figure 7:
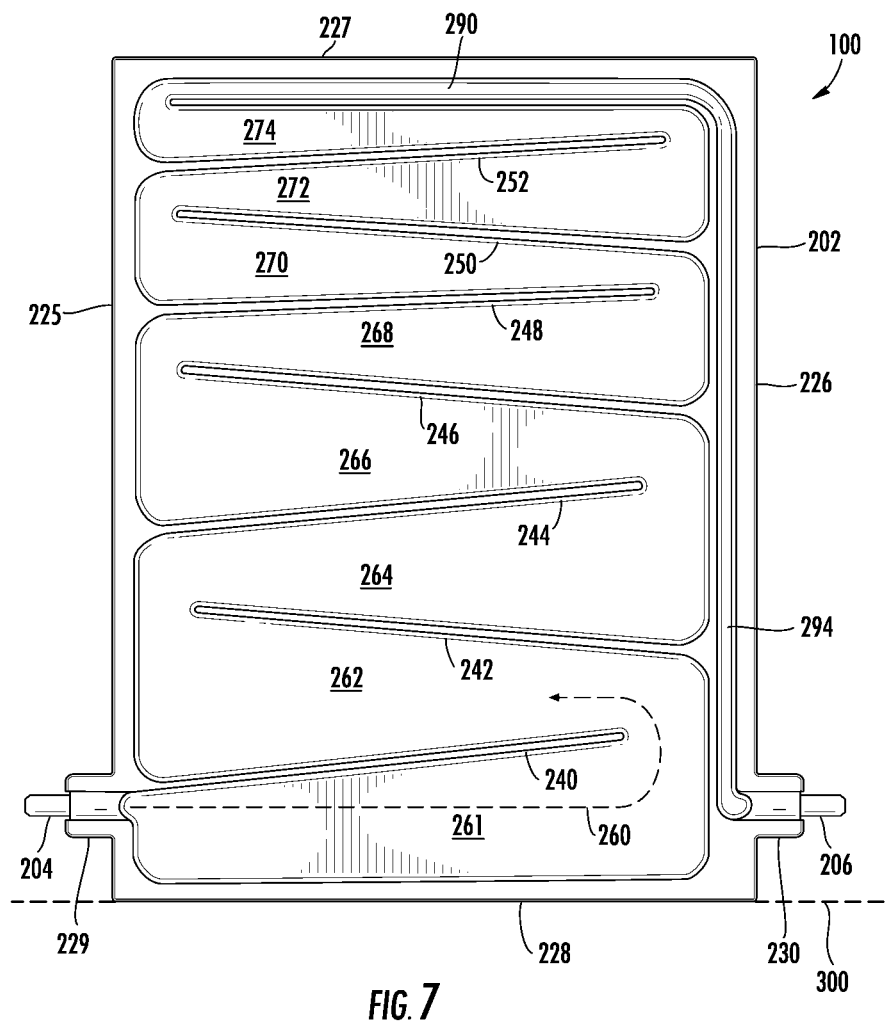
FIG. 7 is a schematic of a first side of a heat exchanger utilized in the battery cell assembly of FIG. 3.
Figure 8:
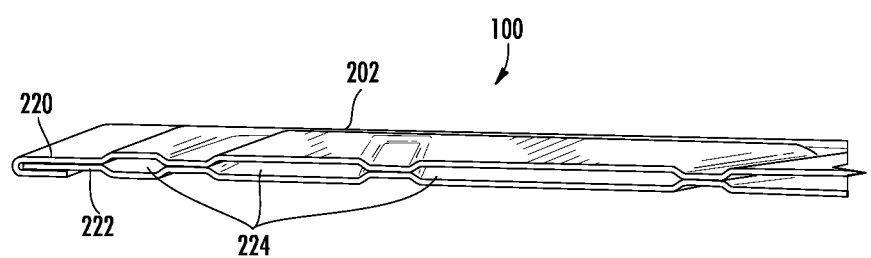
FIG. 8 is a cross-sectional schematic of the heat exchanger of FIG. 7.

Referring to FIGS. 7 and 8, the outer housing 202 is constructed from plate members 220, 222 that are coupled together to form an interior region 224. The outer housing 202 includes edges 225, 226, 227, 228. The edges 225, 226 are substantially parallel to one another and spaced apart from one another. The edges 227, 228 are substantially parallel to one another and spaced apart from one another.

Figure 9:
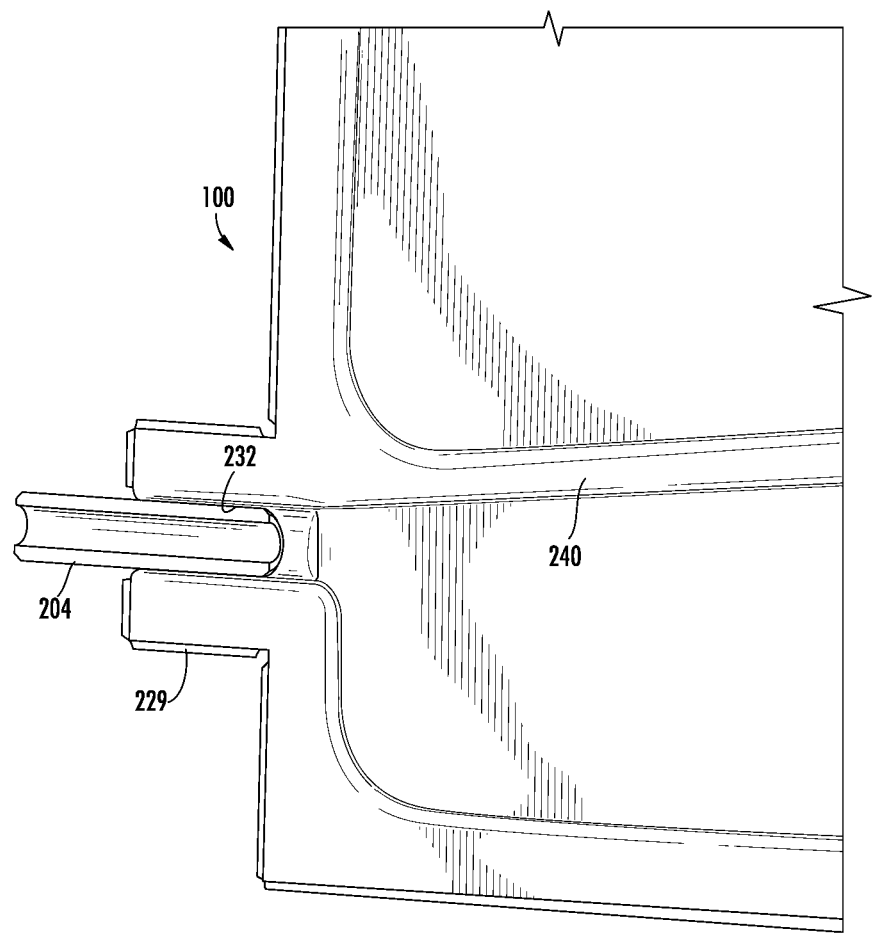
FIG. 9 is a schematic of an inlet extension portion of the heat exchanger of FIG. 7.

Referring to FIGS. 7 and 9, portions of the plate members 220, 222 form an inlet extension portion 229 having an inlet aperture 232. The inlet extension portion 229 is configured to receive the inlet tube 204 within a portion of the inlet aperture 232. The inlet aperture 232 fluidly communicates with both the interior region 224 of the outer housing 202 and with the cooling manifold 78. Thus, fluid entering the inlet tube 204 flows through a portion of the aperture 232 into the interior region 224.

Referring to FIGS. 7 and 8, portions of the plate members 220, 222 are compressed toward one another to form flow guide members 240, 242, 244, 246, 248, 250, 250, 252 within the interior region 224. The flow guide members 240, 242, 244, 246, 248, 250, 250, 252 define the serpentine flow path 260 through the interior region 224.

The flow guide member 240 extends from the edge 225 generally toward the edge 226 and extends upwardly relative to a horizontal axis 300 of the outer housing 100 at an angle in a range of 1-5 degrees. The flow guide member 240 defines a flow path region 261 between the member 240 and the edge 228.

The flow guide member 242 extends from the edge 226 generally toward the edge 225 and extends upwardly relative to the horizontal axis 300 of the outer housing 100 at an angle in a range of 1-5 degrees. The flow guide member 242 defines a flow path region 262 between the flow guide member 242 and the flow guide member 240.

The flow guide member 244 extends from the edge 225 generally toward the edge 226 and extends upwardly relative to the horizontal axis 300 of the outer housing 100 at an angle in a range of 1-5 degrees. The flow guide member 244 defines a flow path region 264 between the flow guide member 244 and the flow guide member 242.

The flow guide member 246 extends from the edge 226 generally toward the edge 225 and extends upwardly relative to the horizontal axis 300 of the outer housing 100 at an angle in a range of 1-5 degrees. The flow guide member 246 defines a flow path region 266 between the flow guide member 246 and the flow guide member 244.

The flow guide member 248 extends from the edge 225 generally toward the edge 226 and extends upwardly relative to the horizontal axis 300 of the outer housing 100 at an angle in a range of 1-5 degrees. The flow guide member 248 defines a flow path region 268 between the flow guide member 248 and the flow guide member 246.

The flow guide member 250 extends from the edge 226 generally toward the edge 225 and extends upwardly relative to the horizontal axis 300 of the outer housing 100 at an angle in a range of 1-5 degrees. The flow guide member 250 defines a flow path region 270 between the flow guide member 250 and the flow guide member 248.

The flow guide member 252 extends from the edge 225 generally toward the edge 226 and extends upwardly relative to the horizontal axis 300 of the outer housing 100 at an angle in a range of 1-5 degrees. The flow guide member 252 defines a flow path region 272 between the flow guide member 252 and the flow guide member 250 and the flow path region 274 above the member 252.

Figure 10:
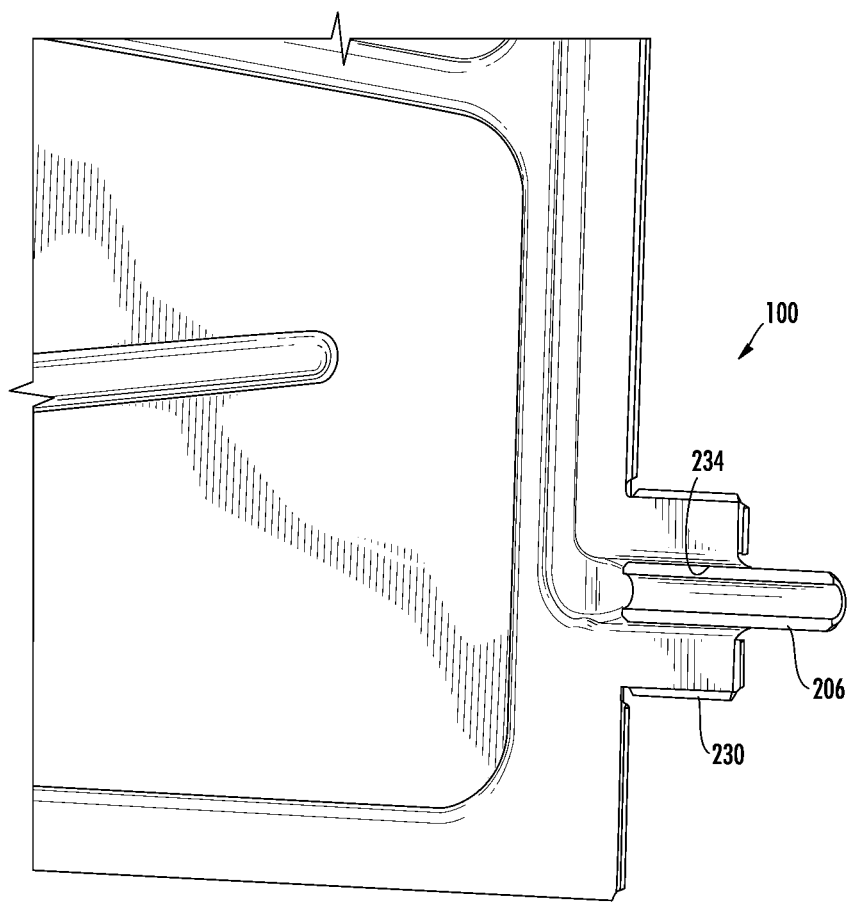
FIG. 10 is a schematic of an outlet extension portion of the heat exchanger of FIG. 7.
Figure 11:
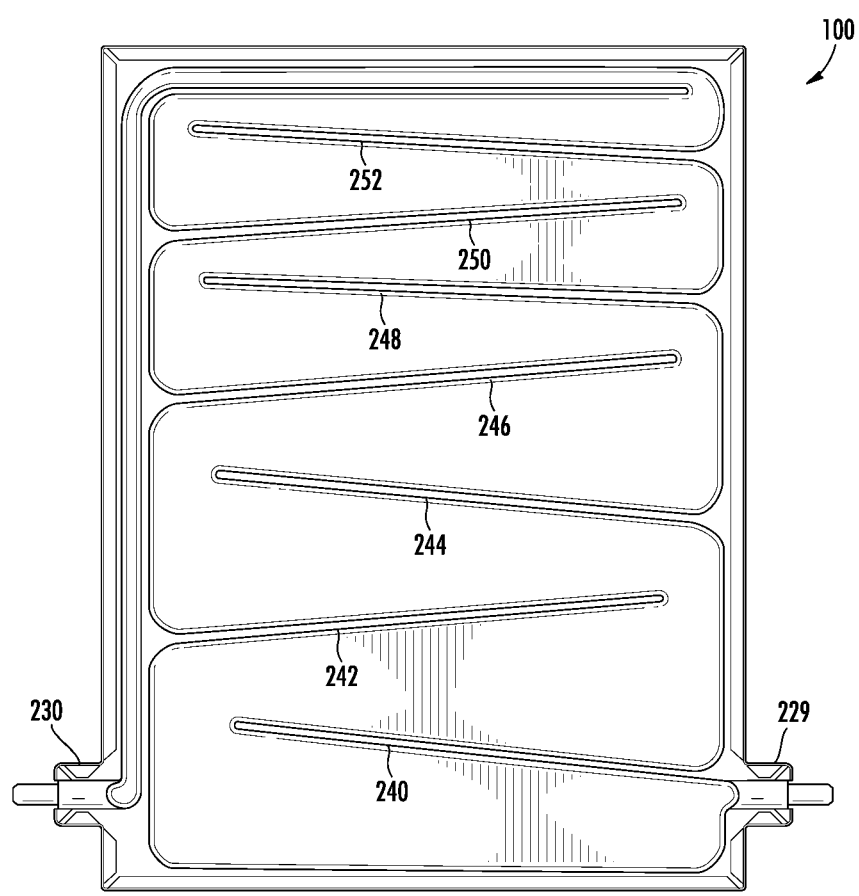
FIG. 11 is a schematic of a second side of the heat exchanger of FIG. 7.

Referring to FIGS. 7 and 10, the serpentine flow path 260 comprises flow path regions 261, 262, 264, 266, 268, 270, 272, 274. When a fluid having air bubbles flows through the serpentine flow path 260, the air bubbles easily migrate from the flow path region 261 through the intermediate flow path regions to the flow path region 274. The serpentine flow path 260 flows into a flow path 290. The flow path 290 is substantially parallel to the edge 227. The flow path 290 has a smaller cross-sectional area than cross-sectional areas of the flow path regions 261, 262, 264, 266, 268, 270, 272, 274 of the serpentine flow path 260. Accordingly, fluid entering the flow path 290 from the serpentine flow path 260 is accelerated and any air bubbles in the fluid are routed through the flow path 290. The flow path 290 flows into a flow path 294 that is substantially parallel to the edge 226. The flow path 294 also has a smaller cross-sectional area than cross-sectional areas of the flow path regions 261, 262, 264, 266, 268, 270, 272, 274 of the serpentine flow path 260. The flow path 294 extends from the flow path 292 the outlet aperture 234. Thus, the fluid and any air bubbles in the fluid are routed through the flow path 294 to the outlet aperture 234.

Portions of the plate members 220, 222 form an outlet extension portion 230 having the outlet aperture 234. The outlet extension portion 230 is configured to receive the outlet tube 204 within a portion of the outlet aperture 234. The outlet aperture 234 fluidly communicates with both the interior region 244 of the outer housing 100 and the cooling manifold 80 shown in FIG. 1. Thus, fluid exiting the aperture 224 exits the outlet tube 206 into the cooling manifold 80.

Referring to FIG. 3, the securement ring-shaped member 102 is provided to further secure the heat exchanger 100 and the battery cell 104 between the rectangular ring-shaped members 90, 106. An outer peripheral size of the securement ring-shaped member 102 is smaller than an outer peripheral size of the rectangular ring-shaped frame member 98 and smaller than an outer peripheral size of the rectangular ring-shaped frame member 106. Referring to FIGS. 5 and 6, the securement ring-shaped member 102 is disposed between the rectangular ring-shaped frame member 98 and a peripheral lip portion of the battery cell 104.

The battery cell 104 is disposed between the rectangular ring-shaped frame member 106 and both a portion of the heat exchanger 100 and the securement ring-shaped member 102. The structure of the battery cell 104 is substantially similar to the battery cell 92.

The rectangular ring-shaped frame member 106 is configured to be coupled to the rectangular ring-shaped frame member 98 for holding the heat exchanger 100, the securement ring-shaped member 102, and the battery cell 104 therebetween.

The battery cell assembly having a heat exchanger with a serpentine flow path provides a substantial advantage over other batteries. In particular, the battery cell assembly has the heat exchanger with the serpentine flow path that provides a technical effect of purging air bubbles in the fluid flowing through the heat exchanger to obtain a desired fluid flow rate through the heat exchanger for cooling battery cells in the battery cell assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery cell assembly, comprising:
a battery cell; and
a heat exchanger disposed adjacent the battery cell configured to cool the battery cell, the heat exchanger having an outer housing, the outer housing having a first side wall and a second side wall coupled to the first side wall;
the first and second side walls of the outer housing defining an interior region, the first and second side walls further defining a plurality of flow guide members in locations where the first side wall is disposed adjacent to the second side wall; the first side wall having a larger outer periphery than an outer periphery of the second side wall; first, second, third, and fourth portions of the first side wall being wrapped around first, second, third and fourth ends, respectively, of the second side wall; the first and second side walls further defining a top edge, a bottom edge, a first side edge, a second side edge, an inlet extension portion, and an outlet extension portion; the first side edge being disposed opposite to the second side edge; the inlet extension portion extending outwardly from the first side edge; the outlet extension portion extending outwardly from the second side edge;
an inlet tube having a portion disposed within the inlet extension portion and another portion extending outwardly from the inlet extension portion;
an outlet tube having a portion disposed within the outlet extension portion and another portion extending outwardly from the outlet extension portion;
the plurality of flow guide members defining a serpentine flow path in the interior region, the plurality of flow guide members tilted upwardly in the interior region, the serpentine flow path extending from an inlet aperture in the outer housing to another flow path in the outer housing, the serpentine flow path having an upper flow path region and other flow path regions disposed below the upper flow path region, the upper flow path region being defined between the top edge and an upper flow guide member of the plurality of flow guide members, a distance between adjacent flow guide members of the plurality of flow guide members is decreased as the serpentine flow path extends from the bottom edge toward the top edge such that the upper flow path region has a smaller cross-sectional area than cross-sectional areas of the other flow path regions, the another flow path being substantially perpendicular to the top edge and having a smaller cross-sectional area than the cross-sectional areas of the other flow path regions; and
the another flow path extending from the serpentine flow path to an outlet aperture such that air bubbles in fluid entering the inlet aperture are urged upwardly through the serpentine flow path and accelerated through the another flow path to exit the outer housing at the outlet aperture, wherein a thickness of the first side wall is substantially equal to a thickness of the second side wall, and portions of the second side wall are wrapped around outer ends of the first side wall.

2. The battery cell assembly of claim 1, wherein a first flow guide member of the plurality of flow guide members is tilted upwardly relative to a horizontal axis of the outer housing at an angle in a range of 1-5 degrees.

3. The battery cell assembly of claim 2, wherein a second flow guide member of the plurality of flow guide members is tilted upwardly relative to the horizontal axis of the outer housing at an angle in a range of 1-5 degrees.

4. The battery cell assembly of claim 3, wherein the first flow guide member of the plurality of flow guide members is spaced apart from the second flow guide member.

5. A battery cell assembly, comprising:
a battery cell; and
a heat exchanger disposed adjacent the battery cell configured to cool the battery cell, the heat exchanger having an outer housing, the outer housing having a first side wall and a second side wall coupled to the first side wall;
the first and second side walls of the outer housing defining an interior region, the first and second side walls further defining a plurality of flow guide members in locations where the first side wall is disposed adjacent to the second side wall; the first side wall having a larger outer periphery than an outer periphery of the second side wall; first, second, third, and fourth portions of the first side wall being wrapped around first, second, third and fourth ends, respectively, of the second side wall; the first and second side walls defining a top edge, a bottom edge, a first side edge, a second side edge, an inlet extension portion, and an outlet extension portion; the first side edge being disposed opposite to the second side edge; the inlet extension portion extending outwardly from the first side edge; the outlet extension portion extending outwardly from the second side edge;

an inlet tube having a portion disposed within the inlet extension portion and another portion extending outwardly from the inlet extension portion;

an outlet tube having a portion disposed within the outlet extension portion and another portion extending outwardly from the outlet extension portion;

the plurality of flow guide members defining a serpentine flow path in the interior region, the plurality of flow guide members tilted upwardly in the interior region, the serpentine flow path extending from an inlet aperture in the outer housing to another flow path in the outer housing, the serpentine flow path having an upper flow path region and other flow path regions disposed below the upper flow path region, the upper flow path region being defined between the top edge and an upper flow guide member of the plurality of flow guide members, a distance between adjacent flow guide members of the plurality of flow guide members is decreased as the serpentine flow path extends from the bottom edge toward the top edge such that the upper flow path region has a smaller cross-sectional area than cross-sectional areas of the other flow path regions; and the another flow path extending from the serpentine flow path to an outlet aperture such that air bubbles in fluid entering the inlet aperture are urged upwardly through the serpentine flow path and accelerated through the another flow path to exit the outer housing at the outlet aperture.

6. The battery cell assembly of claim 5, wherein the another flow path being substantially perpendicular to the top edge and having a smaller cross-sectional area than the cross-sectional areas of the other flow path regions.

7. The battery cell assembly of claim 1, further comprising first and second rectangular ring-shaped frame members being coupled together, the battery cell and the heat exchanger being disposed between the first and second rectangular ring-shaped frame members.

8. The battery cell assembly of claim 7, wherein the inlet tube extends through a side wall of the first rectangular ring-shaped frame member.

9. The battery cell assembly of claim 5, further comprising first and second rectangular ring-shaped frame members being coupled together, the battery cell and the heat exchanger being disposed between the first and second rectangular ring-shaped frame members.

10. The battery cell assembly of claim 9, wherein the inlet tube extends through a side wall of the first rectangular ring-shaped frame member.

* * * * *